G. M. FOX.
ANIMAL TRAP.
APPLICATION FILED JAN. 27, 1915.

1,160,872.

Patented Nov. 16, 1915.

WITNESSES:

INVENTOR
GEORGE M. FOX,
BY Munn & Co.
ATTORNEYS

UNITED STATES PATENT OFFICE.

GEORGE MAYNARD FOX, OF LEXINGTON, NEBRASKA.

ANIMAL-TRAP.

1,160,872.   Specification of Letters Patent.   Patented Nov. 16, 1915.

Application filed January 27, 1915. Serial No. 4,637.

*To all whom it may concern:*

Be it known that I, GEORGE M. FOX, a citizen of the United States, residing at Lexington, in the county of Dawson and State of Nebraska, have invented certain new and useful Improvements in Animal-Traps, of which the following is a specification.

This invention relates to an improvement in animal traps, and more particularly to an improved trap for catching gophers, rats and other rodents.

One of the principal objects of the invention is to provide an improved trap having means whereby the trap may be disposed at or near the mouth of the burrow of an animal and having an improved arrangement for setting and releasing the trap.

A further object of the invention is to provide a trap which will be extremely simple, durable, efficient in operation and inexpensive to manufacture.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1:
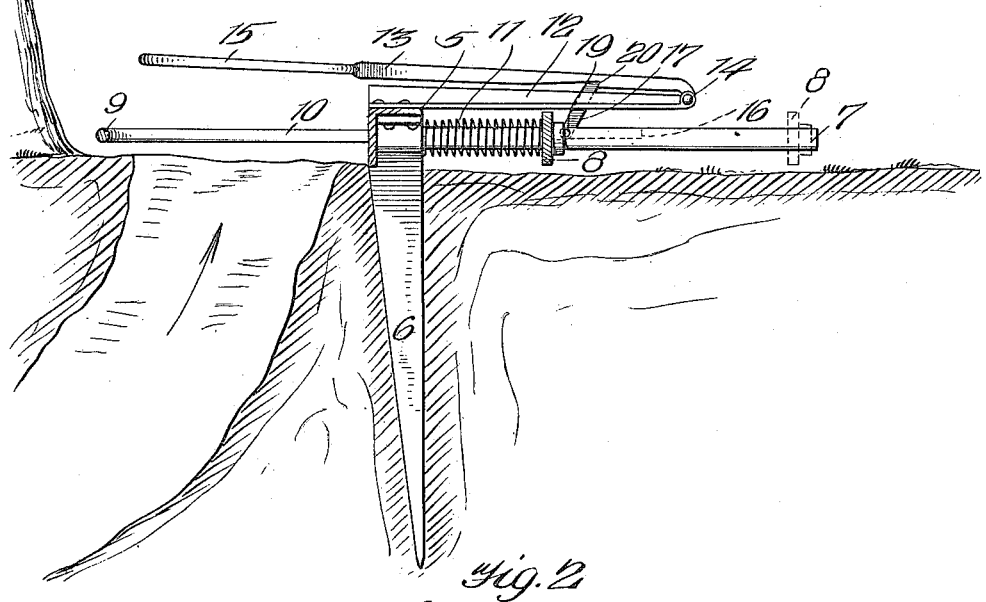
Figure 2:
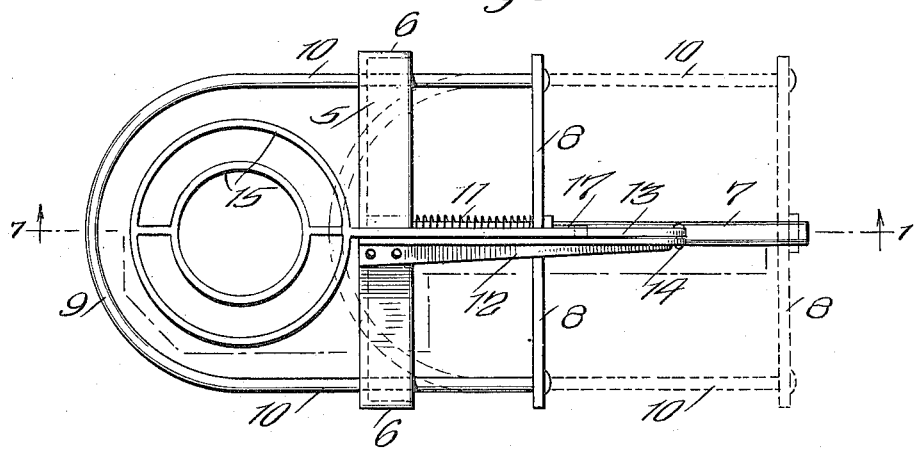
Figure 3:
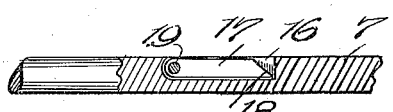

Figure 1 represents a view in section taken on the plane indicated by the line 1—1 of Fig. 2 showing the trap disposed in operable and set position. Fig. 2 represents a top plan view of the trap. Fig. 3 represents a fragmentary view partially in section taken through the main shaft showing the manner in which the trigger is housed therein.

In carrying out my invention I provide a cross bar 5, preferably formed of angle iron. From the opposite ends of the cross bar project prongs 6 whose function it is to anchor the trap to the ground adjacent the burrow of an animal.

Carried centrally upon cross bar 5 and extending at right angles to prong 6 is a shaft 7. A plate 8 is provided with a central opening whereby the plate may be slidably positioned on shaft 7. The plate is substantially of a length equal to cross bar 5, and is connected at its ends to the ends of a bail or loop 9. The latter is formed with its opposite members 10 disposed in parallel relation with each other and with shaft 7. The members or ends 10 slidably extend through cross bar 5 in such a direction that the loop lies on the opposite side of the cross bar from the side on which shaft 7 is positioned. The loop and shaft lie in a common plane, and extend on opposite sides of the cross bar.

Interposed upon shaft 7 between cross bar 5 and plate 8 is a coiled spring 11 whose normal tendency is to force the plate toward the outer end of shaft 7, so that in setting the trap the plate must be forced against the tension of the spring in order to dispose the loop or bail in the full line position shown in Fig. 2.

Secured upon cross bar 5 and extending in a common direction with and substantially parallel to shaft 7, is a support or arm 12. A trigger arm 13 at one end is hingedly connected at 14 to the outer end of support 12, and said arm when the trap is in set position lies in a line parallel with shaft 7, and overhangs the cross bar 5. A pair of rings or loops 15 are rigidly connected to the opposite end of arm 13, and when the trap is in set position lie in a plane above loop 9 and in such relation therewith that the axes of the rings and loop coincide.

Shaft 7 substantially midway its length is recessed as at 16. The recess serves to house a detent or trigger 17 which at one end is beveled as at 18 and which at its opposite end is pivotally connected at 19 with the walls of the recess. The detent is maintained within the recess when the trap is in sprung position by the coils of spring 11, which overhang the recess. When, however, the plate is forced toward cross bar 5 the recess is uncovered so that the detent may, in a manner to be hereinafter described, swing out of the recess and engage in a notch at 20 in the underside of trigger arm 13.

The trap is preferably set before being positioned adjacent the burrow of the animal to be caught. In setting the trap it is preferably held in such position that shaft 7 and loop 9 lie in a vertical plane, with the support 12 extending upwardly and the trigger arm hanging therefrom. The plate is then depressed against the tension of spring 11, and when the recess 16 is uncovered the trap may be tilted so that the detent 17 will drop out of its recess and into engagement with notch 20. Whereupon the trap will be moved into a horizontal position so that the weight of the trigger arm will bear upon the detent, thus maintaining the latter in raised position against the tension of spring 11. The trap may then be disposed adjacent the burrow of an animal through the operation of the prongs 6 in the manner indicated in Fig. 1.

Upon an animal emerging from the burrow and endeavoring to pass through the ring 15, the trigger arm will be raised, thus releasing the detent 17, and the bail or loop 9 will through the action of spring 11 be quickly forced toward the cross bar, thus engaging the animal between the cross bar and loop and either strangling or crushing it to death.

Although the trap will operate properly in its most efficient manner when in horizontal position it will be understood that the trap may be set in any position in which the weight of the trigger arm will maintain said arm in engagement with the detent 17 for restraining the plate against the action of spring 11. The prongs will also serve as means whereby the trap may be secured to the flooring or wall of a building, so that the trap may be utilized in catching mice and rats.

Although I have described the preferred embodiment of my invention, I may desire to make such changes in the construction, combination and arrangement of parts thereof as do not depart from the spirit of the invention and the scope of the appended claims.

I claim:—

1. A trap comprising a cross bar having prongs projecting therefrom, a shaft carried by the cross bar centrally thereof and projecting substantially at right angles to the prongs, a loop having parallel ends slidably extending through the cross bar, said loop being disposed on the opposite side of the cross bar from the shaft, a plate slidably disposed upon the shaft and being secured at its ends to the ends of the loop, a spring interposed upon said shaft between said cross bar and plate, a support carried by the cross bar substantially in parallel relation with the shaft, a trigger arm pivotally connected at one end to the support and at the other end being provided with a ring, said ring when the trap is in set position lying above and substantially concentric with the loop, a detent having a beveled end and pivotally connected at its opposite end to the shaft, said detent adapted to be housed within a recess in said shaft, said trigger arm being provided with a notch wherein said detent is adapted to engage upon depression of the plate, whereby the detent may be maintained in raised position against the tension of said spring.

2. A trap including a cross bar having anchoring means carried thereby, a shaft carried by the cross bar and having a plate slidably arranged thereon, a spring interposed upon the shaft between the plate and cross bar, a loop having its ends slidably extending through the cross bar and fixedly connected with the plate, a support connected with the cross bar and overlying the shaft, a trigger arm pivotally connected with the support and overlying the loop when the trap is in set position, and a detent arranged within a recess in the shaft and adapted to be engaged by the trigger arm and be maintained in raised position for restraining said plate against the action of the spring, said detent adapted to be released when the trigger arm is raised upon engagement of an animal therewith.

3. A trap including a cross bar having a longitudinally arranged loop slidably connected therewith, means for placing the loop under tension in spaced relation to the crossbar when the trap is in set position, a gravity controlled horizontally arranged trigger arm pivotally connected with the crossbar and overhanging the loop, and a gravity controlled pivoted detent associated with the trap and adapted to be engaged by the trigger arm to be maintained in raised position for retaining the loop in set position, said detent adapted to be released when said trigger arm is raised upon engagement of an animal therewith.

GEORGE MAYNARD FOX.

Witnesses:
J. H. SIPES,
FRANK BANKS.

Copies of this patent may be obtained for five cents each, by addressing the "Commissioner of Patents, Washington, D. C."